United States Patent [19]

Thomas

[11] Patent Number: 5,056,235
[45] Date of Patent: Oct. 15, 1991

[54] SIGNAL TRANSMISSION SYSTEM FOR MACHINE TOOLS, INSPECTION MACHINES, AND THE LIKE

[75] Inventor: David K. Thomas, Dursley, United Kingdom

[73] Assignee: Renishaw plc, United Kingdom

[21] Appl. No.: 334,537

[22] Filed: Apr. 7, 1989

[30] Foreign Application Priority Data

Apr. 12, 1988 [GB] United Kingdom ............... 88086137

[51] Int. Cl.⁵ .................. G01B 5/03; G08C 19/16
[52] U.S. Cl. ...................................... 33/503; 33/558;
  340/870.11; 340/680; 340/825.58
[58] Field of Search .................. 33/556–558,
  33/559–561, 503, 832; 340/870.01, 870.11,
  870.12, 680, 686, 825.23, 825.58, 258.71–825.76,
  537; 455/603, 617; 250/338.1, 339, 345, 349;
  375/52, 67, 83

[56] References Cited

U.S. PATENT DOCUMENTS

| | | |
|---|---|---|
| 3,032,745 | 5/1962 | Hamer . |
| 3,290,667 | 12/1966 | Stine . |
| 3,582,921 | 6/1971 | Krieger . |
| 4,145,580 | 3/1979 | Hasegawa ................ 340/825.73 |
| 4,509,266 | 4/1985 | Cusack ................ 33/561 |
| 4,545,106 | 10/1985 | Juengel ................ 29/563 |
| 4,608,714 | 8/1986 | Juengel ................ 455/603 |
| 4,658,509 | 4/1987 | Juengel ................ 33/558 |
| 4,682,118 | 7/1987 | Thiel ................ 455/265 |
| 4,693,110 | 9/1987 | Juengel ................ 33/558 |
| 4,805,314 | 2/1989 | Hayashi et al. ................ 33/503 |

FOREIGN PATENT DOCUMENTS 1333951 10/1973 United Kingdom .

OTHER PUBLICATIONS

Electronics Letters, vol. 20, No. 23, Nov. 8, 1984, pp. 971–973, Staines, Middlesex, GB.
Georgopoulos et al: "Hybrid IR/RF Transmission System with Common Modulating Circuit", Laser Focus, Mar. 1985, No. 3.

Primary Examiner—Thomas B. Will
Attorney, Agent, or Firm—Oliff & Berridge

[57] ABSTRACT

Probes (18A, 18B, 18C) can be interchangeably mounted in the spindle (12) of a machine tool. Each probe has an optical signal transmission system, in which an optical signal from a light emitting diode (24) is transmitted to a receiving photodiode (26). To prevent interference between the different probe signals, each probe modulates the emitted light at a different carrier frequency. The receiver (28) contains electronic bandpass filters to separate out the different carrier frequencies. The signal information is encoded onto the optical signal by phase modulation of the carrier frequency.

10 Claims, 2 Drawing Sheets

SIGNAL TRANSMISSION SYSTEM FOR MACHINE TOOLS, INSPECTION MACHINES, AND THE LIKE

FIELD OF THE INVENTION

This invention relates to signal transmission systems, e.g. for use on machine tools, coordinate measuring machines, inspection robots, and the like (hereinafter referred to as "machine tools").

DESCRIPTION OF PRIOR ART

Various probes are known for the inspection of workpieces on such machines. They include trigger probes which provide a trigger signal when they contact or attain a predetermined relationship with a workpiece surface, and measurement probes which provide a digital or analog output concerning the position of the surface.

Particularly when the probe is to be interchangeable with other tools, as in a machine tool, it is known to provide a wireless transmission system for transmitting the probe output signal back to an interface with the machine. For example, U.S. Pat. No. 4,509,266 describes an optical (infra red) transmission system. Such systems are also commercially available from Renishaw Metrology Ltd, of Wotton-under-Edge, Gloucestershire, United Kingdom. Similar systems can also be used to transmit signals from other sensors, e.g. relating to the presence or position of workpieces on the machine bed or on a conveyor or pallet, or to the status of a device such as a vise, a gripper or a robot. See, for example, U.S. Pat. No. 4,545,106. Other wireless transmission systems are also known, e.g. using radio waves instead of optical radiation.

It is known to have a transmitter which receives two sensor signals for transmission. For example, US Patents 4,608,714 and 4,658,509 provide two signals to a single transmitter, and the two signals are modulated onto the infra red beam transmitted by a frequency shift keying (FSK) method. The infra red receiver is provided with circuits to demodulate and detect the two signals from the received beam. The above-noted commercial systems from Renishaw Metrology Ltd use an asynchronous serial transmission method, in which the infra red beam is switched on to denote a logical '1' and off to denote a logical '0', during serial transmission of a binary word which commences with a start bit, followed by bits representing the desired signal information. This provides for the transmission of greater amounts of information.

If it is desired to transmit sensor information from two or more separate transmitters, however, the problem arises that the separate transmissions may interfere with one another. For example, this may occur if two probes or other sensors are installed on a machine. U.S. Pat. No. 4,608,714 shows an FSK system in which the center frequency of the transmitter and of the receiver can be individually tuned. This would make it possible to use two or more transmitter/receiver sets, tuned to different center frequencies. However, the arrangement of that patent does not have direct applicability to systems which can transmit greater information, such as the serial transmission method noted above, since if one simultaneously transmits two serial signals it is difficult for the receiver to separate the two signals.

SUMMARY OF THE INVENTION

The present invention provides a signal transmission system for a machine tool which has a plurality of sensors for producing a signal in response to a sensed condition, the system comprising:

a plurality of signal transmission means, one for each sensor, for transmitting data associated therewith, carrier generating means in each signal transmission means, for generating a carrier signal for transmission by said signal transmission means, the carrier signal of each transmission means having a different frequency, phase modulating means in each signal transmission means, for modulating said data onto said carrier signal by modulating the phase thereof, receiving means for receiving the signals transmitted by the plurality of signal transmission means, and a filter contained in the receiving means, the filter being responsive to the carrier frequency of a said transmission means.

Possibly there may be a plurality of receivers, one for each sensor, each containing a filter responsive to a respective carrier frequency. However, preferably there is one receiver containing a plurality of said filters responsive to the respective different carrier frequencies.

Preferably the data is transmitted by the transmission means in serial binary form. The phase modulation may be performed by inverting the phase of the carrier signal to represent a logical "1" or "0" of the binary information.

Preferably the signal transmission means and receiving means transmit and receive the signal optically (e.g. using infra red radiation), but other transmission means can be used such as radio transmission.

BRIEF DESCRIPTION OF THE DRAWINGS

A preferred embodiment of the invention will now be described by way of example, with reference to the accompanying drawings, wherein.

DESCRIPTION OF PREFERRED EMBODIMENT

Figure 1:
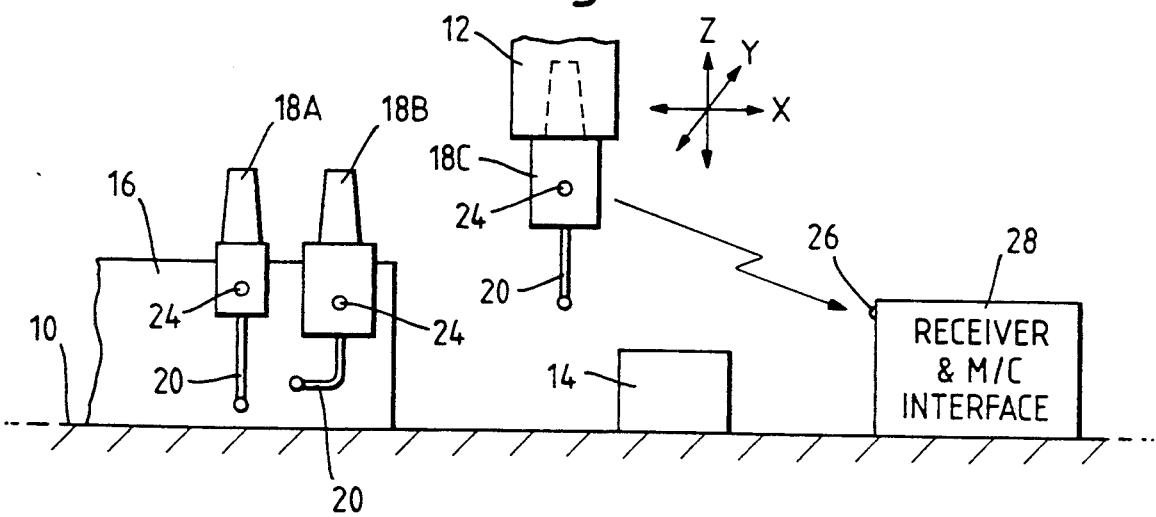
FIG. 1 is a schematic diagram of a machine tool.

FIG. 1 shows the bed 10 and tool holding spindle 12 of a machine tool. The spindle 12 can be moved in X,Y and Z directions relative to the bed 10, in order to perform machining and inspection operations upon a workpiece 14 clamped to the bed 10. To machine the workpiece, the spindle 12 can pick up any of a variety of cutting tools (not shown) stored in a tool magazine 16, under the program control of a computer numerical control (not shown). To perform inspection operations, the spindle 12 can pick up any of a plurality of battery-operated probes 18A,18B,18C which are also stored in the magazine 16. Three such probes are shown, but there may be only two, or more than three.

Figure 2:
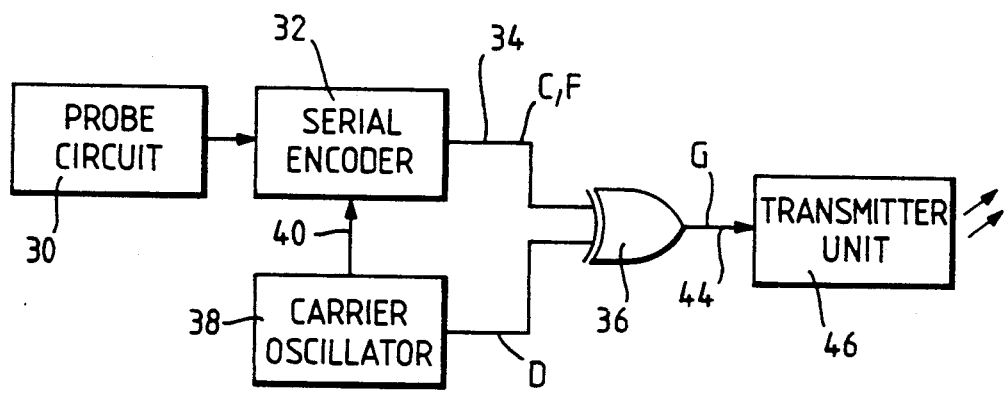
FIG. 2 is a block diagram of a signal transmission circuit provided in a probe.

The probes shown in FIG. 1 have workpiece-contacting styli 20, and they may be either touch trigger probes, or measurement or scanning probes which provide outputs proportional to stylus displacement. Alternatively, they may sense the workpiece in a non-contact manner, e.g. optically. Each has a circuit 30 (FIG. 2) which generates the touch trigger or other probe output signal, and other signals which are conventional, such as an indication of whether the battery in the probe is in good condition. To transmit these probe signals back to the machine, each probe is provided with a transmitter unit 46 (FIG. 2), including an infra red light emitting diode (LED) 24 on the surface of the probe as shown in FIG. 1. If desired, more than one such LED can be spaced around the circumference of the probe to provide omni-directional transmission. The probe circuit 30 and the transmitter unit 46 are generally conventional, and need not be described further. The probe output signals are thus transmitted optically to a receiver module 28 which is interfaced with the numerical control of the machine.

However, if two of the conventional transmitter units should happen to be transmitting an optical signal at the same time, there is a risk of both being received by the receiver module 28. In previously known systems, this could cause interference between the different probes, and so it was necessary to ensure that only one probe was transmitting at any one time. This meant that two probes could not be used simultaneously, as is increasingly a requirement ( for example in a dual spindle machining centre, where there may be a probe in each spindle, or on a lathe where there may be both a probe for workpiece gauging and a probe for tool setting). There is also a danger of interference between probes on adjacent machine tools. Even in an environment where only one probe is used at once, where advantage can be taken of the fact that conventionally, each probe switches itself off after a pre-determined period of non-use (say one or two minutes), it is necessary to wait until the end of the one or two minute period before commencing to use another probe. This is a waste of time and therefore an inefficient use of the machine tool. The following arrangement is therefore adopted instead.

The transmission circuit (FIG. 2) within each probe contains an encoder 32. This produces a serial binary word which encodes the data from the probe circuit 30. The serial binary word is produced by the encoder 32 every time a trigger signal is to be transmitted, and otherwise it is also sent regularly once every 16.4 ms. This provides a "heartbeat" to indicate to the receiver 28 that the probe is functioning. Each serial binary word is sent in a time window of 64 $\mu$s, and the light emitting diode 24 is entirely off outside these time windows in order to save battery energy. This transmission window is shown at A in FIG. 4.

Figure 4:
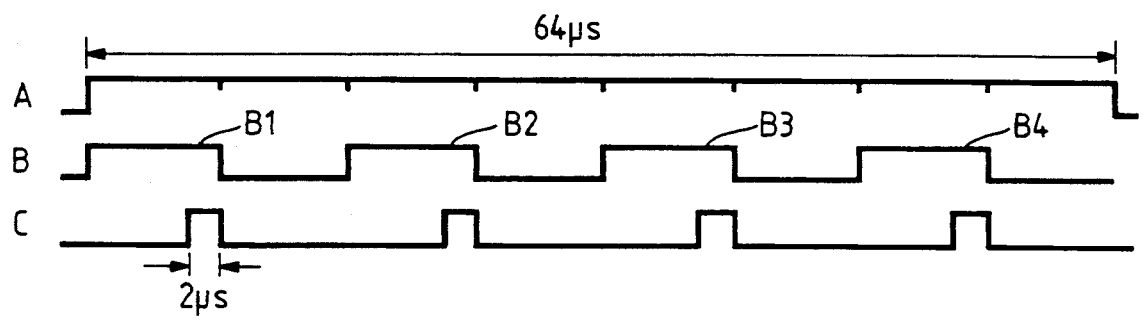
FIGS. 4, 5 and 6 are waveform diagrams which illustrate the operation of the circuits of FIGS. 2 and 3.

Waveform B in FIG. 4 shows four bits of information which are to be encoded into the signal by the encoder. A pulse B1 is a start bit; a pulse B2 indicates the probe status; a pulse B3 indicates whether the probe contacts are open or closed; and a pulse B4 indicates the battery condition. It will be appreciated, that with the exception of the start bit B1 which is always high, each of these pulses may be high or low (present or absent), depending on the information to be transmitted. The probe status bit B2 is only high if the "probe open or closed" bit B3 has changed state since the last transmission window; this gives a form of error checking and also facilitates immediate recognition of the fact that the probe has just been triggered by contact with the workpiece 14. The serial encoder 32 outputs this information in the form shown at C in FIG. 4, on a line 34. It will be seen that each bit of the information signal B corresponds to a 2 $\mu$s pulse C1,C2,C3,C4 (or the absence of such a pulse) in the signal C.

Of course, the information signal shown at FIG. 4B is merely an example of what might be transmitted in respect of a touch trigger probe. It will be appreciated that the serial word may contain more or less 4 bits, depending on the type of sensor and the amount of information which is to be transmitted. For example, a measurement probe (i.e. one which measures displacement of the stylus 20) may have many more bits in the word in order to represent the displacement as a binary number with the required degree of resolution. Indeed the information may be transmitted over several such binary words, especially if the measurement probe is providing displacement information in three dimensions x,y,z. Of course, the invention can also be applied to sensors other than probes, for example to sensors for the presence or absence of a workpiece 14 on the bed 10 of the machine tool, or for indicating the operation or status of a vise or gripper or workpiece handling robot or conveyor associated with the machine tool. The number of bits in the binary word will be selected to suit the amount of information to be transmitted from each of these different types of sensor.

In the present embodiment of the invention, instead of using the signal C directly to switch the light emitting diode 24 on and off, as would have happened in prior art systems, the output 34 of the encoder 32 is taken to an exclusive-OR gate 36. The other input of the gate 36 is driven by an oscillator 38, which generates a carrier signal. The serial encoder 32 has an input 40 from the oscillator 38, so that the pulses of the serial binary word are synchronised with the carrier signal. The carrier signal has a different frequency for each of the probes 18A,18B,18C or other sensors of the machine tool, so as to enable the receiver 28 to distinguish signals from different sensors and probes. In particular, the various frequencies of the different probes and sensors are all even multiples or sub-multiples of each other. For example, the carrier frequency of one probe may be 500kHz, that of another may be 1MHz, another 2MHz, and so on. Frequencies which are even multiples and sub-multiples of each other are used because it is easier to generate them ( and subsequently to separate them in the receiver module 28). However, this is not essential, as long as the frequencies are different. It will be appreciated that if the pulses C1 to C4 have a width of 2 $\mu$s, then 500kHz is the lowest carrier frequency which can be used.

Figure 5:
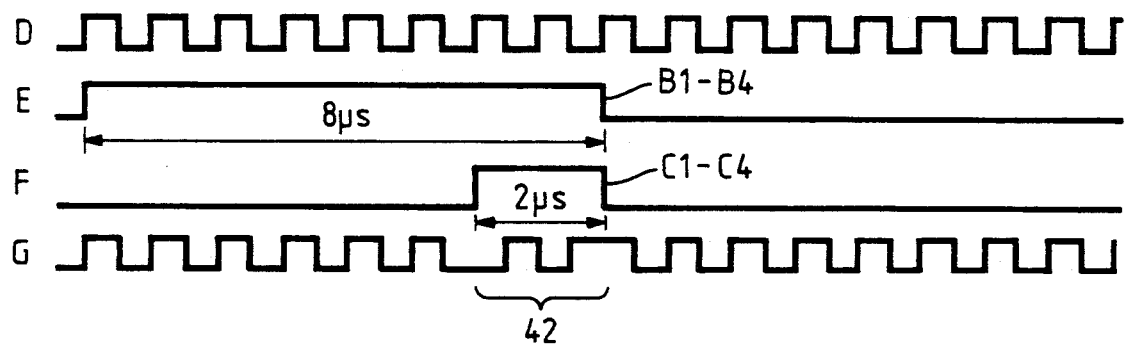

The exclusive-OR gate 36 phase modulates the information signal C onto the carrier frequency, by a technique known as phase shift keying (PSK). This is illustrated in FIG. 5 for a 1 MHz carrier signal, shown at D. The waveforms B and C from FIG. 4 are reproduced on an expanded scale at E and F in FIG. 5, and the resulting output from the exclusive-OR gate 36 is shown at G. As can be seen, there is a region 42 of the resultant output signal in which the phase of the 1MHz carrier has been inverted (shifted through 180°), corresponding to one of the pulses C1 to C4, if present. That is, a given bit of the binary information (high or low) is encoded onto the resulting signal as the presence or absence of a phase-inverted region 42. The output 44 of the exclusive-OR gate 36 is taken to the transmitter unit 46, and transmitted optically.

Thus, the infra red signal transmitted from the light emitting diode 24 to the receiving photo diode 26 consists of a 64 $\mu$s burst of pulses at 1MHz, phase modulated as just described, repeated every 16.4 ms.

Figure 3:
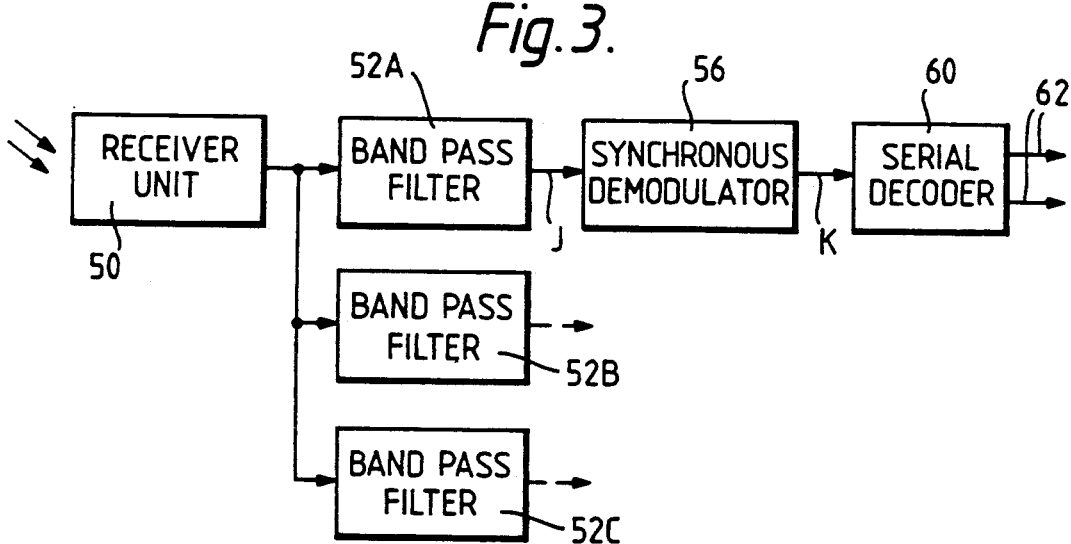
FIG. 3 is a block diagram of a receiver circuit.

The circuit of the receiver module 28 can be seen in FIG. 3. A receiver unit 50 contains the photo diode 26 which receives the transmitted infra red signals. It feeds the resulting signal to a plurality of band pass filter circuits 52A,52B,52C. Each of these filter circuits is selectively tuned to one of the carrier frequencies of the various probes and sensors, and there is a corresponding filter for each such probe and sensor. Of course, if desired, it would be possible to have a separate receiver circuit 50 and a separate photodiode 26 for each of the filter circuits 52A to 52C.

Figure 6:
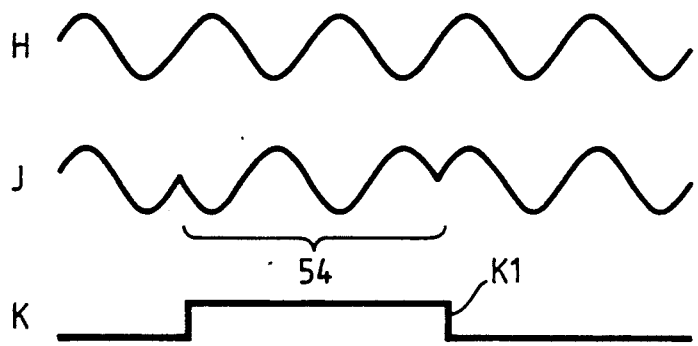

FIG. 3 shows the complete circuit for only one of the channels, which receives its signal from the filter 52A, and it will be understood that the other channels are similar. The output of the filter 52A is shown in FIG. 6. Waveform H shows an idealised sine wave at 1MHz, corresponding to the carrier signal of waveform D, FIG. 5.

A likewise idealised version of a portion of the actual signal emanating from the filter 52A is shown at J. As can be seen, it contains a phase-inverted region 54 corresponding to a phase-inverted region 42 in the transmitted signal G. The output of the filter 52 is taken to a synchronous demodulator 56, the operation of which is generally conventional. Briefly, it regenerates a carrier signal such as shown at H from the incoming signal, and then uses this regenerated carrier to synchronously demodulate the incoming signal J. Waveform K represents a portion of the output signal appearing on an output line 58. A phase-inverted region such as 54 produces a pulse such as shown at K1 in waveform K.

Thus, the output on the line 58 recreates the serial binary word appearing on the line 34 in the transmitter, as shown at C in FIG. 4. This signal is taken to a serial decoder 60, which decodes the binary word and produces outputs 62 corresponding to the original probe information. For example, one of the outputs 62 will be a trigger input to the machine interface, which is used to indicate to the machine that the probe has just contacted a workpiece 14. In well known manner, the machine numerical control program will take a reading of the instantaneous coordinates of the machine spindle 12, and will also halt movement of the spindle so as to prevent the probe being driven further into the workpiece 14 (which could case damage). Of course, in the event of the transmission described being used for other probes and other sensors, the outputs of the serial decoder 60 will be as appropriate for the sensor concerned.

A Fourier analysis of the signals transmitted by the system described has been carried out. This shows that when the phase modulation described is performed on the various different carrier frequencies, the resulting signals received by the receiver unit 50 can be successfully separated by the filters 52 without interference from one channel to the other. Thus, it is possible for two or more probes or other sensors to be transmitting signals simultaneously without interfering with each other.

Because the carrier signal from each probe is sent in short bursts, not continuously, the transmitter described uses very little power, which leads to long battery life. This is important since it is desirable with such probes that the batteries should require changing as infrequently as possible. Furthermore, the transmitter can be an all-digital system, which further saves power and is easy to implement.

What is claimed is:

1. A signal transmission system for a machine tool which has a plurality of sensors for producing a signal in response to a sensed condition, the system comprising:
   a plurality of signal transmission means, one for each sensor, for transmitting data associated therewith,
   carrier generating means in each signal transmission means, for generating a carrier signal for transmission by said signal transmission means, the carrier signal of each transmission means having a different carrier frequency,
   phase modulating means in each signal transmission means, for modulating said data onto said carrier signal by modulating the phase thereof,
   receiving means for receiving the signals transmitted simultaneously by the plurality of signal transmission means, and
   a plurality of filters contained in the receiving means and corresponding in number to the plurality of signal transmission means, each filter being responsive to one of the carrier frequencies of the plurality of signal transmission means to separate the data on a corresponding carrier signal from the data on other carrier signals without interference among the carrier signals.

2. A signal transmission system according to claim 1, wherein said receiving means is a single receiver, containing the plurality of filters responsive to the responsive different carrier frequencies.

3. A signal transmission system according to claim 1, wherein the transmission means have means for transmitting the data in serial binary form.

4. A signal transmission system according to claim 1, wherein the phase modulating means comprises means for inverting the phase of the carrier signal to represent a logical "1" or "0" of binary data.

5. A signal transmission system according to claim 4, wherein the inverting means comprises an exclusive-OR gate.

6. A signal transmission system according to claim 1, wherein the transmission means comprise optical transmission means and the receiving means comprise optical receiving means.

7. A signal transmission system according to claim 6, wherein the signals are transmitted by infra red radiation.

8. A signal transmission system according to claim 3 wherein the transmission means comprise optical transmission means and the receiving means comprise optical receiving means.

9. A signal transmission system according to claim 8, wherein the transmission means transmits the data as serial binary words, in separate time windows, the optical transmission means being entirely off outside said time windows.

10. A signal transmission system according to claim 1, wherein different carrier frequencies of the carrier signals of the plurality of signal transmission means are even multiples and sub-multiples of each other.

* * * * *